United States Patent

Lewis

[15] 3,695,456

[45] Oct. 3, 1972

[54] PALLET RACK

[72] Inventor: William L. Lewis, North East, Pa.

[73] Assignee: Bernard Gloekler, North East, Pa.

[22] Filed: July 17, 1970

[21] Appl. No.: 55,659

[52] U.S. Cl. .............. 211/148, 211/177, 287/189.35
[51] Int. Cl. ............................ A47f 5/10, F16b 5/06
[58] Field of Search........ 211/148 B, 148 R, 177, 176, 211/182; 287/189.36 C, 189.36 F, 189.36 R, 54 C, 54 B, 54 A, 189.35; 108/109–110

[56] References Cited

UNITED STATES PATENTS

| | | | |
|---|---|---|---|
| 3,463,325 | 8/1969 | Zagotta et al. | 211/148 |
| 2,976,823 | 3/1961 | Dodge | 287/189.35 X |
| 2,866,233 | 12/1958 | Lydard | 287/189.35 X |
| 3,266,209 | 8/1966 | Zibell | 287/189.36 R X |

FOREIGN PATENTS OR APPLICATIONS

| | | | |
|---|---|---|---|
| 368,131 | 3/1932 | Great Britain | 287/189.35 |

Primary Examiner—Ramon S. Britts
Attorney—Charles L. Lovercheck

[57] ABSTRACT

A rack for storing pallets or the like. The rack is made up of vertical columns, lateral and cantilevered structural members fixed to the vertical columns, and longitudinal rails supported on the structural members. These rails, in the preferred embodiment of the invention, are in the form of channels having their lower edges turned inward. The rails are connected to the lateral or cantilevered structural members by joints which include a clamp plate. The clamp plate has a square body which fits between the legs of the channel and the square body has two flanges, one flange at each of two opposite sides of the body. The body is received in the channel overlying the inturned edges. The flanges of the clip cradle, the top part of the transverse structural members and a bolt extends through the clip and through the structural members. Thus, the clip holds the rails rigidly to the lateral or cantilevered structural members and holds the entire assembly in rigid relation.

2 Claims, 4 Drawing Figures

PATENTED OCT 3 1972

Inventor
WILLIAM L. LEWIS
By
Charles L. Loventhal
Attorney

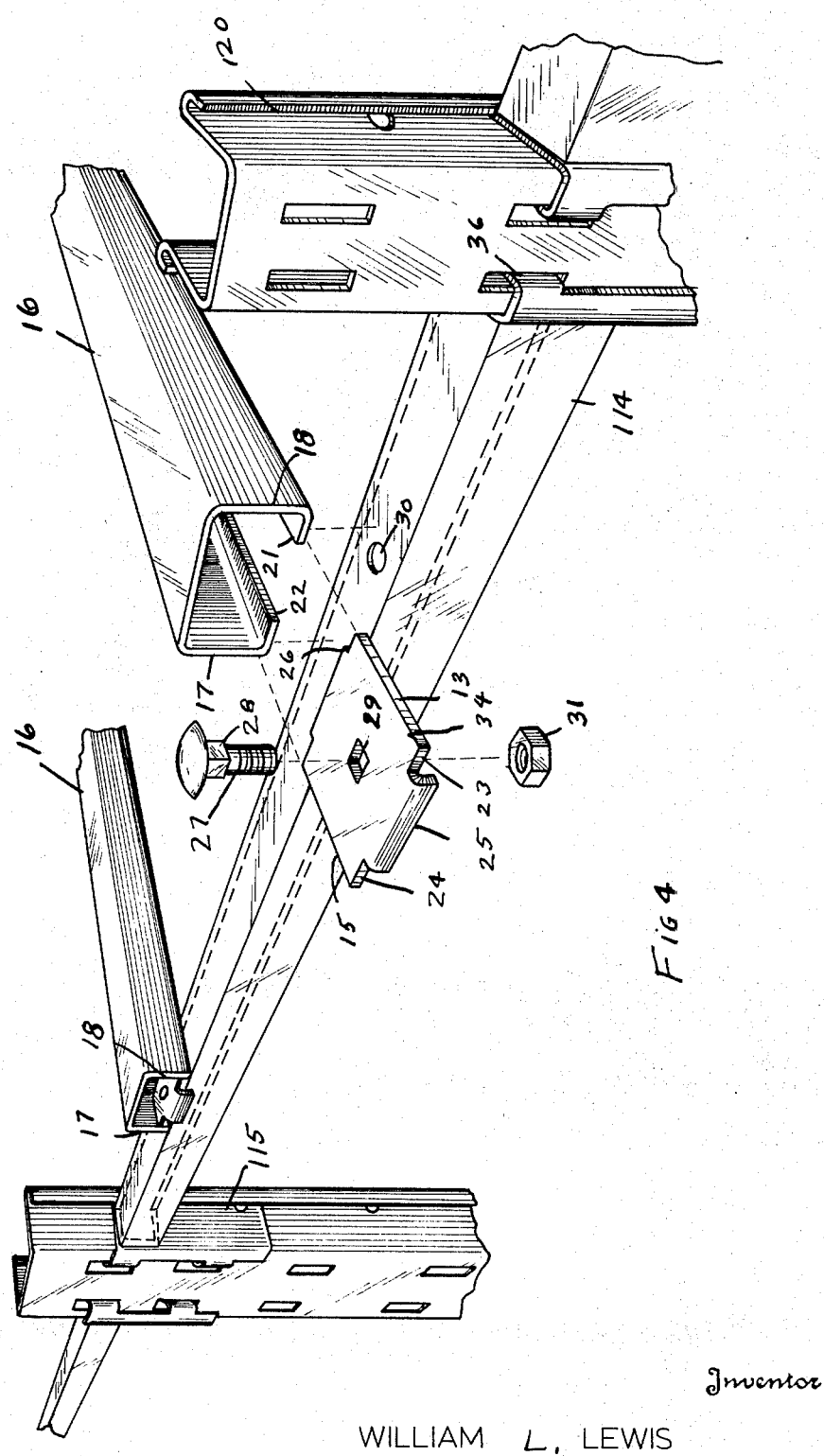

3,695,456

PALLET RACK

STATEMENT OF INVENTION

This invention relates to racks and, more particularly, to racks in combination with joints for connecting the structural members of the racks together.

STATEMENT OF PRIOR ART

Racks of the general type disclosed herein are shown in U.S. Pat. Nos. 3,152,670 and 3,097,747.

OBJECTS OF THE INVENTION

It is an object of the invention to provide an improved means for connecting two transversely disposed structural members together.

Another object of the invention is to provide a joint for connecting the rails of the pallet rack to the columns of the racks.

Another object of the invention is to provide an improved structural joint for connecting two structural members together.

Another object of the invention is to provide an improved rack for supporting pallets.

GENERAL DESCRIPTION OF THE DRAWINGS

FIG. 4 is an exploded view showing the parts of the joint according to the invention.

DETAILED DESCRIPTION OF THE DRAWINGS

Figure 1:
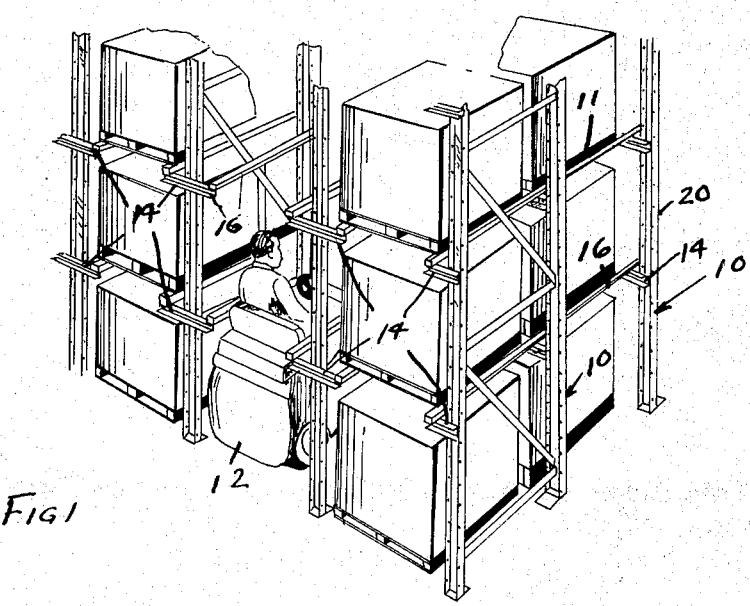
FIG. 1 is a partial isometric view of a pallet rack according to the invention.

The rack indicated generally at 10 is of the general type shown in U.S. Pat. Nos. 3,152,670 and 3,097,747. The rack 10 for supporting pallets is generally shown in FIG. 1. The pallets indicated at 11 are supported on the longitudinal rails 16 of the racks. The fork truck indicated at 12 may move between the aisles of the racks in a conventional manner.

Figure 2:
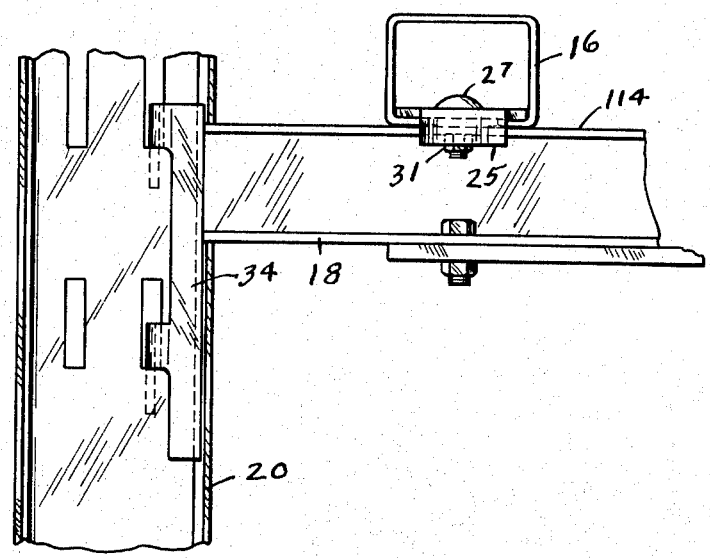
FIG. 2 is an enlarged partial view of a part of the rack showing an end view of the joint according to the invention.
Figure 3:
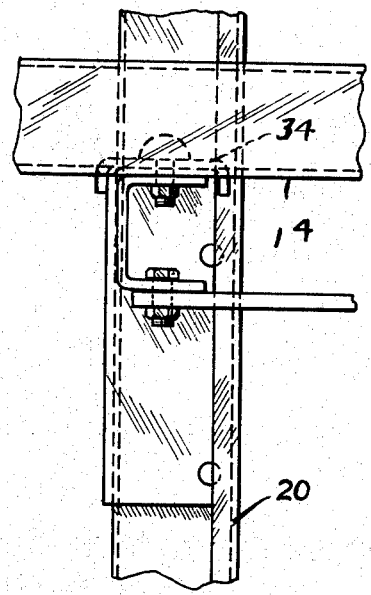
FIG. 3 is another view similar to FIG. 2 of part of the rack showing the joint.

The rack has columns 20 which have cantilevered structural members 14 fixed to the columns and the cantilevered structural members 14 support the first structural members or rails 16 which are attached to the structural members 14 by means of joints shown more particularly in FIG. 3.

It will be noted that the rails are spaced from the columns to provide a ledge for supporting the pallets 11. The columns are spaced laterally from each other a sufficient distance that a fork truck can move freely between the aisles formed by the columns.

The connections of the rails or first longitudinal members 16 to the cantilevered members 14 are made by means of joints like those shown in FIG. 4. The vertical column members 120 in the embodiment shown in FIG. 4 are connected to the lateral transverse members 114 by means of the bracket arrangement 115 shown. This same type of connection can be used to connect the members 14 to the columns 20 in the embodiment of FIG. 1.

The rails 16 in the embodiment of FIG. 1 are connected to the cantilevered members 14 by means of plates 34, like the clip plate 34, which have lateral side edges 13 and 15. These edges fit snugly between the legs 17 and 18 of rails 16. The edges 21 and 22 of the rails 16 are turned inwardly toward each other and the edges 23 and 24 of the clips 34 are received snugly between the legs 17 and 18 and overlie the edges 21 and 22. The edges 23 and 24 rest on the edges 21 and 22 of the channel rails 16 and the edges 25 and 26 of the clips are turned down so that they cradle the structural member 114 between them. The bolt 27 has a shank 28 which is received in the square hole 29 in the clip and the bolt extends through the hole 30. A nut 31 is placed on the lower end of the bolt. Thus the rails 16 are rigidly fixed to the transverse or cantilevered members 14 and 114.

It will be noted that the side edges 13 and 15 of the clips restrain torsional movement of the rails 16 relative to the structural or cantilevered members 114 and 14 and likewise the legs 25 and 26 resist torsional movement of the clip relative to the members 114 or 14. The bolts 27 firmly hold the rails 16 and members 14 firmly together. Thus the entire rack is rigid and resists shaking movements.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A joint between a channel and a structural member,
    said channel being disposed generally at right angles to said structural member,
    said structural member having a flat upper surface and two spaced edges defining surfaces extending downwardly therefrom,
    said channel having spaced legs resting on said flat upper surface,
    the ends of said legs being turned inwardly toward each other and terminating in spaced relation to each other,
    a one-piece clip,
    said clip being in the form of a flat platelike body member received within said channel and overlying said legs of said channel,
    the lateral dimension of said body member being substantially equal to the distance between said legs of said channel,
    two opposite edges of said clip being turned downwardly to define relatively short flanges extending between said legs of said channel,
    the width of each of said flanges being substantially equal to the spacing between the inturned ends of said legs,
    said clip being comprised solely of said body member and said flanges,
    said flanges of said clip engaging said edges of said structural member whereby said structural member and said channel member are held against relative swinging movement
    a headed bolt having a threaded shank extending through a central opening in the body member of said clip and into said structural member and a nut engaging said threaded shank thereby holding said members tightly together, said bolt and said clip having cooperating means preventing relative rotation therebetween.

2. A rack for pallets or the like comprising spaced vertically extending columns and horizontally spaced horizontally extending racks comprising structural members, means attaching said structural members to said columns, a channel, a joint between said channel and said structural member, said channel being disposed generally at right angles to said structural member, said structural member having a flat upper surface and two spaced edges defining surfaces extending downwardly therefrom, said channel having spaced legs resting on said flat upper surface, the ends of said legs of said channel being turned inwardly toward each other and terminating in spaced relation to each other, a one-piece clip, said clip being in the form of a flat platelike body member received within said channel and overlying said legs of said channel, the lateral dimension of said body member being substantially equal to the distance between said legs of said channel, two opposite edges of said clip being turned downward to define relatively short flanges extending between said ends of said channel leg edges and engaging said spaced edges of said structural member whereby said channel and said structural member are held against swinging movement relative to each other, the width of each of said flanges being substantially equal to the spacing between said ends of said channel legs, said clip being comprised solely of said body member and said flanges, a headed bolt having a threaded shank extending through a central opening in the body member of said clip and into said structural member and a nut engaging said threaded shank thereby holding said member and said channel rigidly together, said bold and said clip having cooperating means preventing relative rotation therebetween.

* * * * *